United States Patent
Kamiyama et al.

(10) Patent No.: US 7,510,357 B2
(45) Date of Patent: Mar. 31, 2009

(54) BORING DEVICE

(75) Inventors: Takao Kamiyama, Hiratsuka (JP); Koji Kaneta, Hiratsuka (JP); Kenji Fujii, Hiratsuka (JP)

(73) Assignee: Shonan Gosei-Jushi Seisakusho K.K. (JP)

( * ) Notice: Subject to any disclaimer, the term of this patent is extended or adjusted under 35 U.S.C. 154(b) by 263 days.

(21) Appl. No.: 11/399,248

(22) Filed: Apr. 6, 2006

(65) Prior Publication Data

US 2006/0233619 A1    Oct. 19, 2006

(30) Foreign Application Priority Data

Apr. 15, 2005 (JP) ............................. 2005-117634
May 17, 2005 (JP) ............................. 2005-143381

(51) Int. Cl.
*B23B 41/08* (2006.01)

(52) U.S. Cl. .......................... 408/79; 408/114; 408/129; 408/714; 138/97

(58) Field of Classification Search .................. 408/79, 408/113, 114, 129, 714, 80; 138/97; 175/73; *B23B 41/08*
See application file for complete search history.

(56) References Cited

U.S. PATENT DOCUMENTS

| 2,786,218 | A | * | 3/1957 | Yousem | 15/104.33 |
|---|---|---|---|---|---|
| 3,016,073 | A | * | 1/1962 | Broussard et al. | 408/85 |
| 4,029,428 | A | * | 6/1977 | Levens | 408/127 |
| RE29,526 | E | * | 1/1978 | Jeter | 175/73 |
| 4,245,970 | A | * | 1/1981 | St. Onge | 425/13 |
| 4,291,727 | A | * | 9/1981 | Yie et al. | 138/93 |
| 4,842,452 | A | * | 6/1989 | Strait | 408/80 |
| 5,322,398 | A | * | 6/1994 | Schmidt et al. | 408/145 |
| 5,411,082 | A | * | 5/1995 | Kennedy | 166/181 |
| 5,816,345 | A | * | 10/1998 | Keller | 175/53 |
| 6,511,266 | B1 | * | 1/2003 | Groot | 408/1 R |
| 2006/0175094 | A1 | * | 8/2006 | Falgout | 175/61 |
| 2006/0207798 | A1 | * | 9/2006 | Smith et al. | 175/73 |
| 2007/0163810 | A1 | * | 7/2007 | Underwood et al. | 175/61 |
| 2008/0083567 | A1 | * | 4/2008 | Downton et al. | 175/73 |

FOREIGN PATENT DOCUMENTS

JP     63232905 A  *  9/1988

* cited by examiner

*Primary Examiner*—David P Bryant
*Assistant Examiner*—Eric A Gates
(74) *Attorney, Agent, or Firm*—Adams & Wilks

(57) ABSTRACT

A boring device is inserted into a lateral pipe to bore a pipe lining material inserted into a main pipe across the lateral pipe intersecting therewith and a portion of which blocks an opening of the lateral pipe that communicates with the main pipe. The boring device has a rotatable shaft, a bearing member for rotatably bearing the rotatable shaft, and a boring blade mounted on the rotatable shaft for rotation therewith to bore through the portion of the pipe lining material that is blocking the opening of the lateral pipe. A supporting member is mounted on one side of the bearing member. An inflatable bag is mounted on the other side of the external periphery of the bearing member. The inflatable bag is inflatable in the lateral pipe so that the inflatable bag and the supporting member are pressed against an internal peripheral surface of the lateral pipe.

20 Claims, 5 Drawing Sheets

BORING DEVICE

BACKGROUND OF THE INVENTION

1. Field of the Invention

The present invention relates to a boring device inserted into a lateral pipe to bore a pipe lining material that is inserted into a main pipe across the lateral pipe intersecting therewith.

2. Description of the Prior Art

A lining construction method has been proposed in the past for lining an existing pipe using a pipe lining material in order to rehabilitate an existing pipe without unearthing the pipe when a buried sewer line or other existing pipe has deteriorated with age (see JP-A 6-114939). The pipe lining material is a resin absorbent material composed of a tubular flexible nonwoven cloth impregnated with an uncured liquid curable resin (generally a thermosetting resin), formed so as to conform to the shape of the existing pipe. A highly airtight plastic film is attached to the outer circumferential surface of the resin absorbent material. In this construction method, fluid pressure is used to invert and insert the pipe lining material into the existing pipe, and, with the pipe lining material pressed against the internal circumferential surface of the existing pipe, heat is applied to the pipe lining material to cure the liquid thermosetting resin impregnated therein to provide a lined existing pipe.

Lateral pipes also join the main pipe of a sewer or the like. Therefore, when the pipe lining material is used to line the main pipe, it blocks the openings at which the lateral pipes join with the main pipe. A robot equipped with a boring device and a TV camera for operating inside a pipe is therefore placed in the main pipe and remote-controlled from above ground. The cutter (rotary blade) of the boring device is then rotated, and the portion of the pipe lining material that is blocking the end of the lateral pipe is bored through and removed (see FIGS. 5 through 8 of JP-A 2000-15509).

However, in this operation, the cutter of the boring device must be positioned in the longitudinal and vertical directions of the main pipe prior to boring. This positioning is performed while monitoring the inside of the main pipe using the TV camera, but since the inside of the main pipe is dark and yields poor visibility, errors sometimes occur in positioning, specifically, in the boring position.

In order to overcome this drawback, a method is employed whereby a hole saw connected to a flexible shaft for transmitting the rotational energy of a motor is inserted into the lateral pipe prior to the boring, and a pilot hole having a small diameter is formed from the side of the lateral pipe in the portion of the pipe lining material that blocks the opening at the end of the lateral pipe. After the pilot hole is formed, the TV camera is inserted into the lateral pipe, and boring is performed from the side of the abovementioned main pipe while monitoring the inside of the lateral pipe (see FIGS. 10 and 11 of JP-A 2000-15509).

However, in the method for forming a pilot hole from the side of the lateral pipe, the hole saw is supported by the flexible shaft so as to be able to move in the direction orthogonal to the longitudinal direction of the lateral pipe. Therefore, it is difficult to position the hole saw in the desired boring position (in the center of the opening at the end of the lateral pipe, or another position, for example) in the orthogonal direction inside the lateral pipe, and the boring position is sometimes displaced from the desired position.

Particularly when the pipe lining material blocking the opening of the lateral pipe has a hard surface, the hole saw can slip and move in the direction orthogonal to the longitudinal direction of the lateral pipe due to rotational recoil, and can collide with the internal peripheral surface of the lateral pipe. In this case, the hole saw is damaged, the pipe lining material suffers damage when a lateral pipe is being lined, or other such drawbacks occur.

An object of the present invention is therefore to provide a boring device whereby a boring blade can be easily and reliably positioned when a pipe lining material that blocks the opening at the end of a lateral pipe is bored through, and whereby the boring blade can be prevented from colliding with the internal peripheral surface of the pipe.

SUMMARY OF THE INVENTION

A boring device according to the invention is inserted into a lateral pipe to bore a pipe lining material which is inserted into a main pipe across the lateral pipe intersecting therewith and a portion of which blocks an opening of the lateral pipe that communicates with the main pipe. The boring device comprises a boring blade for boring the pipe lining material; positioning means for positioning the boring blade in the direction orthogonal to the longitudinal direction of the lateral pipe; and means for driving the boring blade towards the pipe lining material with its orthogonal direction positioned so as to bore through the portion of the pipe lining material that is blocking the opening of the lateral pipe.

In the boring device of the present invention, the boring blade can be easily and reliably positioned in the direction orthogonal to the longitudinal direction of the lateral pipe by the positioning means, and boring can be reliably performed without displacement of the position when a pipe lining material is bored through because the boring blade is maintained in a constant position in the direction orthogonal to the longitudinal direction of the lateral pipe by the positioning means during boring.

In the invention, a weighting member is also used to firmly press the boring blade against the pipe lining material using its weight. This also allows the inertia of the main body of the boring device to increase. Therefore, it is difficult for the boring blade to slip on the pipe lining material, and even if slippage does occur, it becomes difficult for the boring blade to move in the direction orthogonal to the longitudinal direction of the lateral pipe, and the boring blade can be prevented from colliding with the internal peripheral surface of the lateral pipe. This collision can also be reliably prevented by furthermore providing the protective cover.

Further features of the invention, its nature and various advantages will be more apparent from the accompanying drawings and following detailed description of the invention.

DETAILED DESCRIPTION OF THE PREFERRED EMBODIMENT

Embodiments of the invention will now be described with reference to the accompanying drawings.

The embodiments are described herein of a boring device used for boring a portion of a pipe lining material that is employed to line a main pipe in a sewage system. The portion of the pipe lining material blocks the opening at the end of the portion of a lateral pipe that communicates with the main pipe, and this portion is bored from the side of the lateral pipe. The boring operation performed by the boring device in the embodiments is described in a case in which the lateral pipe is not yet lined at the time of boring, but boring is performed in the exact same manner when the lateral pipe is already lined at the time of boring.

Figure 1:
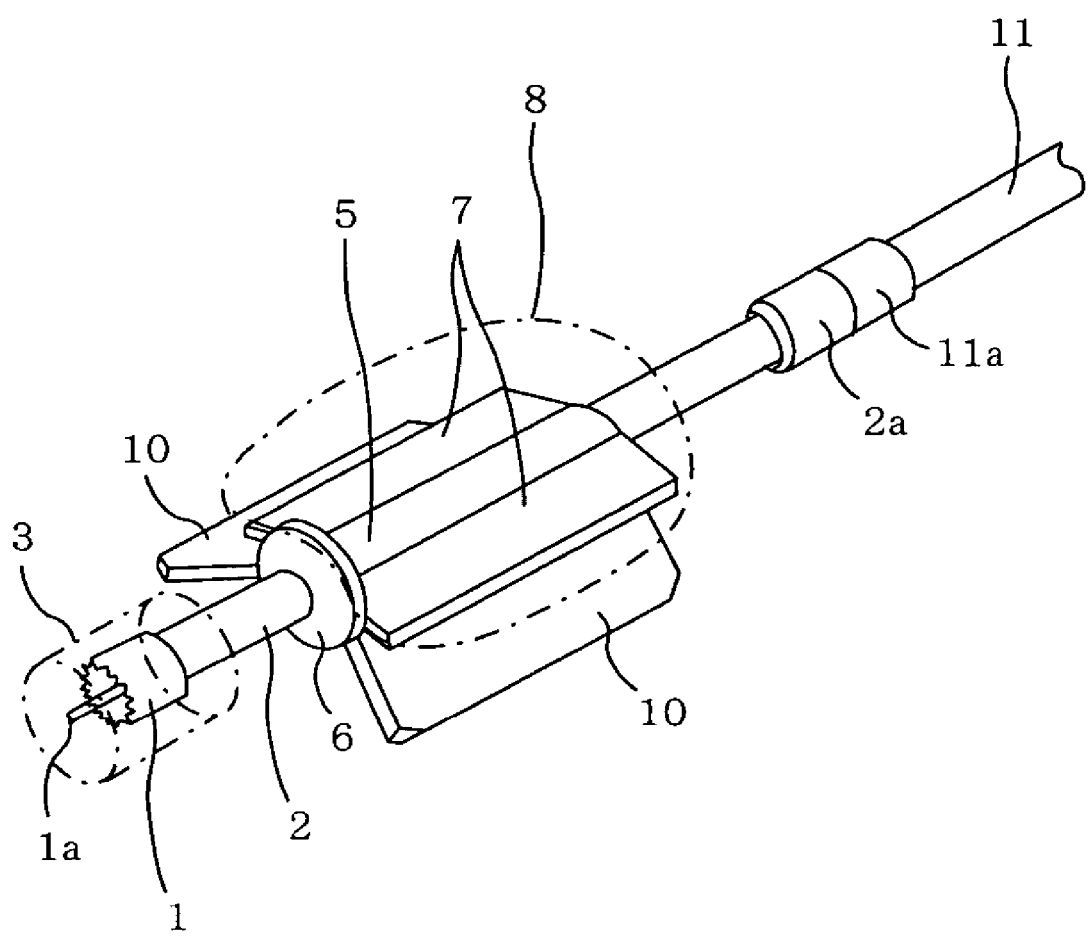
FIG. 1 is a perspective view showing a boring device according to one embodiment of the present invention.
Figure 2:
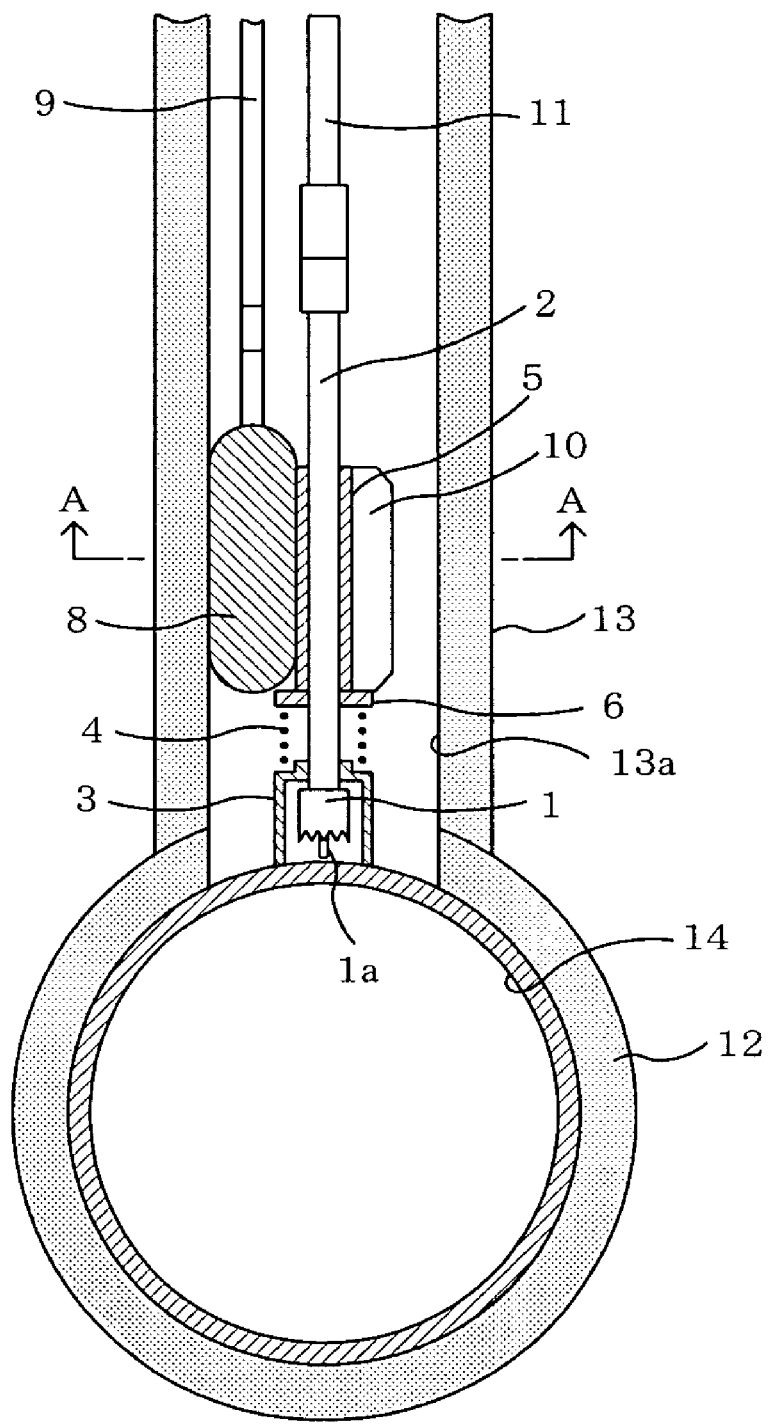
FIG. 2 is a sectional view showing a state in which the boring device of FIG. 1 is positioned inside the lateral pipe.

FIG. 1 is a perspective view showing the structure of the main body of a boring device according to one embodiment of the present invention, and FIG. 2 is a sectional view showing a state in which the main body is inserted into the lateral pipe.

The reference numeral 1 indicates a boring blade for boring a pipe lining material 14. The boring blade is in the form of a cylindrical rotating hole saw in which saw teeth are formed on the entire circumference of the distal end, and in which a drill 1a is provided so as to protrude from the center. The hole saw 1 is connected so as to be detachable, that is, replaceable, by a spring structure or the like (not shown) to the distal end of a rotating shaft 2 for rotatably supporting the hole saw.

The reference numeral 3 indicates a protective cover for enclosing and protecting the hole saw 1. The protective cover 3 is formed as a cylinder in which the internal diameter is a prescribed dimension larger than the external diameter of the hole saw 1, and is provided so as to be able to rotate relative to the distal end of the rotating shaft 2 and slide in the longitudinal direction of the rotating shaft 2. The protective cover 3 is composed of a material such as plastic or hard rubber which does not damage the cured pipe lining material in a collision. The protective cover 3 is urged towards the distal end of the rotating shaft 2 by the pressure of a spring (coil spring) 4, and is restricted by the spring 4 so as not to rotate together with the rotating shaft 2. A stopper or other device (not shown) defines a position to which the protective cover 3 is limited in moving towards the distal end of the rotating shaft 2 so that the protective cover 3 does not come in contact with the hole saw 1. When the protective cover 3 is positioned at the aforementioned movement limit, the distal ends of the protective cover 3 and the drill 1a are positioned in the same plane, or the distal end of the drill 1a is slightly withdrawn with respect to the protective cover 3, and the entire hole saw 1 including the drill 1a is enclosed and protected by the protective cover 3.

The reference numeral 5 indicates a bearing member that is formed in a cylindrical shape, is fitted over the middle portion of the rotating shaft 2, acts as a bearing that is able to slide in the longitudinal direction of the rotating shaft 2, and allows the rotating shaft 2 to rotate. A disk-shaped stopper 6 having a hole formed in the center thereof is fixed to the distal end of the bearing member 5. The spring 4 is provided so as to wrap around the rotating shaft 2 between the stopper 6 and the protective cover 3.

Figure 3:
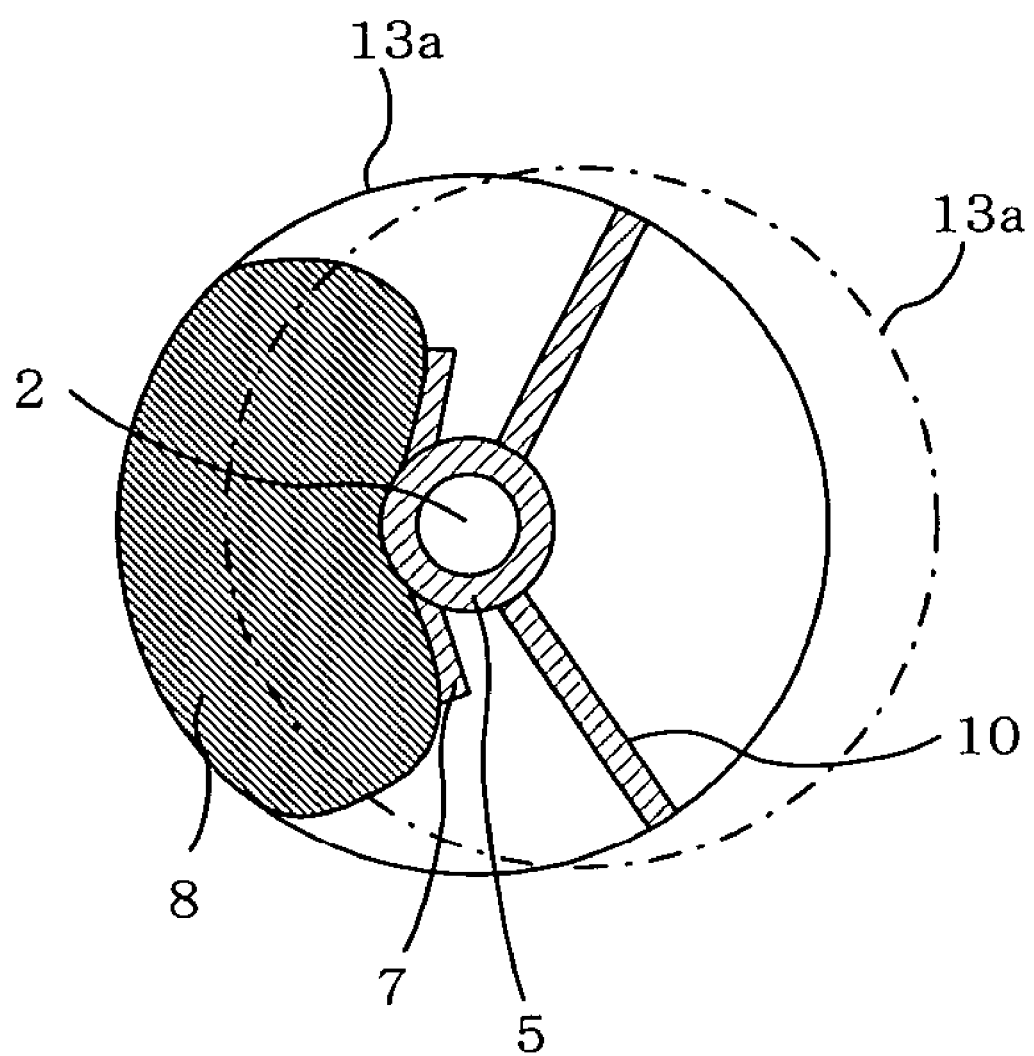
FIG. 3 is a sectional view along line A-A in FIG. 2.

Two rectangular bag mounting fins (mounting member) 7 are vertically arranged on one side (the top side in FIG. 1; the left side in FIG. 3 (sectional view along line A-A in FIG. 2)) of the external periphery of the bearing member 5. The bag mounting fins 7 extend from the external periphery of the bearing member 5 to form a prescribed obtuse angle (about 150°, for example) with respect to each other.

Figure 4:
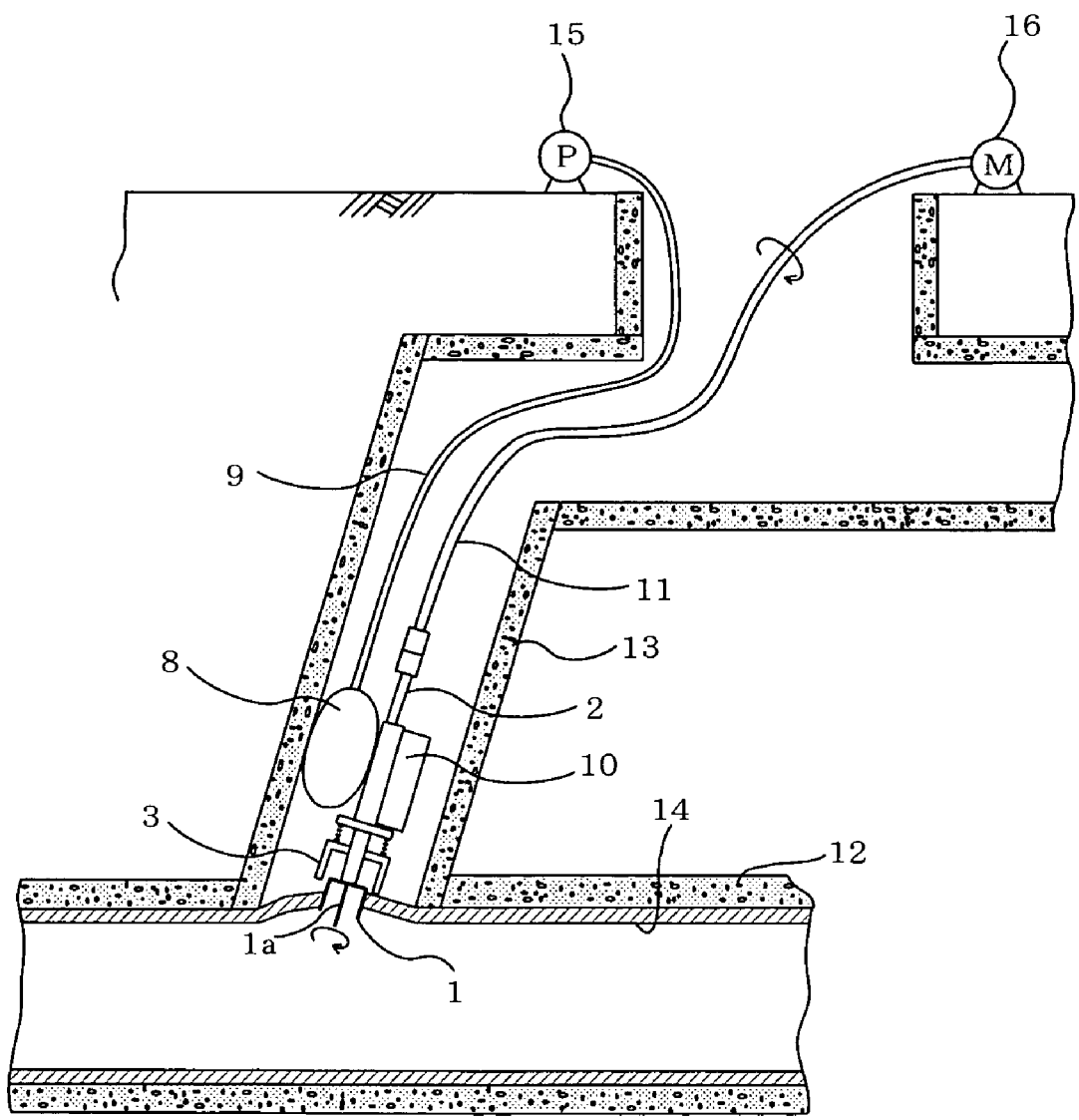
FIG. 4 is a sectional view showing how a pipe lining material that blocks the opening at the end of the lateral pipe is bored through by the boring device.

An air bag 8 is mounted on the bag mounting fins 7 via a screw or other mounting device (not shown) so as to be detachable, that is, replaceable. The air bag 8 is a pouched object composed of rubber or another soft, elastic material, and one end of an air hose 9 is connected to the air bag. As shown in FIG. 4, the other end of the air hose 9 is connected to an air pump 15. High-pressure air is fed from the air pump 15 to the air bag 8 via the air hose 9, whereby the air bag 8 can be inflated to or beyond the size shown in FIGS. 2 through 4.

Two approximately rectangular support fins (supporting member) 10 composed of plastic or the like are vertically provided on the side (the bottom side in FIG. 1; the right side in FIG. 3) opposite the air bag 8 on the external periphery of the bearing member 5. The support fins 10 extend from the external periphery of the bearing member 5 along the radial direction of the rotating shaft 2 to form a prescribed obtuse angle (about 120°, for example) with respect to each other. The hole saw 1 is positioned in the direction orthogonal to the longitudinal direction (hereinafter referred to as the "orthogonal direction") of the lateral pipe 13 by the positioning device made up of the support fins 10 and the air bag 8.

By removing the detachable hole saw 1 from the distal end of the rotating shaft 2, the protective cover 3 and spring 4 can be removed from the rotating shaft 2, and the bearing member 5 provided with the stopper 6, bag mounting fins 7, and support fins 10 can be pulled off of the rotating shaft 2 and removed. Specifically, the support fins 10 are detachable, that is, replaceable, with respect to the rotating shaft 2 together with the bearing member 5. The support fins 10 may also be mounted on the bearing member 5 via a screw or other fastening device so as to be detachable, that is, replaceable as a unit.

One end of a flexible shaft 11 is detachably connected via joints 2a and 11a to the proximal end of the rotating shaft 2. The other end of the flexible shaft 11 is connected to a motor 16 shown in FIG. 4. The rotational energy of the motor 16 is transmitted to the rotating shaft 2 via the flexible shaft 11, the rotating shaft 2 rotates, and the hole saw 1 also rotates. When the angle of deflection of the lateral pipe 13 is large, the joints 2a and 11a are universal joints.

With the boring device configured as described above, the pipe lining material 14 that lines the main pipe 12 shown in FIGS. 2 and 4 is bored through from the side of the lateral pipe 13 at the portion blocking the opening at the end of the lateral pipe 13. At this time, the main body of the boring device connected to the air hose 9 and the flexible shaft 11 is first inserted into the lateral pipe 13. The air hose 9 and flexible shaft 11 are then reeled out, and the main body of the boring device is pushed in and inserted to the approximate position shown in FIG. 2; specifically, to the position where the protective cover 3 or the distal end of the drill 1a comes in contact with the pipe lining material 14 that blocks the opening of the lateral pipe 13 communicating with the main pipe 12. At this time, even if the protective cover 3 collides with the pipe lining material 14, the spring 4 is compressed and retracted, and the impact of the collision is softened.

During this insertion, high-pressure air is not fed to the air bag 8, and the air bag 8 is deflated to its natural size, which is significantly smaller than the size shown in FIGS. 2 through 4. The positional relationship of the main body of the boring device with respect to the internal peripheral surface 13a of the lateral pipe 13 shown in FIG. 3 can thereby be caused to conform to a positional relationship such as the relationship to the internal peripheral surface 13a of the lateral pipe 13 indicated by the dashed line. Specifically, the support fins 10 can be kept from coming into no contact with and not obstructing the internal peripheral surface 13a of the lateral pipe 13. This assures that the main body of the boring device is smoothly inserted. Since the flexible shaft 11 is caused to bend, the direction of the main body of the boring device can be changed so as to pass through without creating an obstruction, even in the deflecting portion of the lateral pipe 13.

When the main body of the boring device has been inserted to the approximate position shown in FIG. 2, the aboveground air pump 15 is activated, high-pressure air is fed to the air bag 8 via the air hose 9, and the air bag 8 is inflated to the size shown in FIGS. 2 through 4. Specifically, the air bag 8 presses each of the support fins 10 against the internal peripheral surface 13a of the lateral pipe 13, and the air bag 8 is also inflated to a size whereby it presses against the internal peripheral surface 13a of the lateral pipe 13, as shown in FIG. 3. The bearing member 5 is fixed in the position shown in FIG. 3 by this pressing of the air bag 8 and support fins 10 by air pressure. The rotating shaft 2 is also positioned as shown in the drawing in the orthogonal direction of the lateral pipe 13, and the hole saw 1 is positioned in the same position. In this arrangement, the dimension (hereinafter referred to as the extension dimension of the support fins 10) from the center of the rotating shaft 2 to the ends on the external sides of the support fins 10 extending along the radial direction of the rotating shaft is made the same as the internal radius of the lateral pipe 13, for example. The rotating shaft 2 is thus positioned in the center of the lateral pipe 13, and the hole saw 1 is also positioned in the center of the opening of the lateral pipe 13.

The flexible shaft 11 is then pressed towards the main body of the boring device, the rotating shaft 2 is caused to slide towards the main pipe 12, and the drill 1a of the hole saw 1 is pressed against the pipe lining material 14. The above-ground motor 16 is then activated, and the hole saw 1 is rotated. By this operation, a small hole is first made by the drill 1a. By furthermore pressing the main body of the hole saw 1 into the pipe lining material 14, the pipe lining material 14 is bored through by the main body of the hole saw 1 as shown in FIG. 4. During this operation, the rotating shaft 2 is caused to slide into the main pipe 12 relative to the bearing member 5 fixed in place by the air bag 8 and the support fins 10, and relative to the protective cover 3 that is stopped by contact with the pipe lining material 14. The pipe lining material 14 is thereby bored through in the center of the opening of the lateral pipe 13 that communicates with the main pipe 12.

A hole of the lining material formed at the center of the opening of the lateral pipe 13 serves as a pilot hole. In this case, after the pilot hole is made, the main body of the boring device is withdrawn from the lateral pipe 13 to above ground, and a TV camera not shown in the drawing is inserted into the lateral pipe 13. While the inside of the lateral pipe 13 is monitored, a main hole whose diameter corresponds to that of the opening of the lateral pipe 13 is formed from the side of the main pipe 12 by a robot (not shown) equipped with a boring device operated within the main pipe.

The main hole can also be made from the side of the lateral pipe 13 by the boring device of the present embodiment. For this, small holes are formed without gaps at a plurality of locations in a circle having the same center as the opening of the lateral pipe 13 and a prescribed radius R2 that is smaller than the radius R1 of the internal diameter of the lateral pipe 13. Connecting all the small holes on the circle would result in formation of one large main hole. In this case, the support fins 10 are replaced with fins whose extension dimension is a dimension (R1−R2) that is reduced from the radius R1 of the internal diameter of the lateral pipe 13 by an amount equal to the aforementioned prescribed radius R2. If the size to which the air bag 8 can be inflated is insufficient for positioning, the air bag is replaced with one that can inflate to a larger size.

When the pipe lining material 14 blocking the end portion of the lateral pipe 13 is to be bored through by using the boring device of this embodiment, the hole saw 1 can be easily and reliably positioned in the orthogonal direction of the lateral pipe 13 by the air bag 8 and support fins 10. Furthermore, by replacing the support fins 10 with fins having a different extension dimension, or replacing the air bag 8 with one that can inflate to a different size as needed, the hole saw 1 can be positioned in the desired position in the orthogonal direction of the lateral pipe 13 according to differences in the internal diameter of the lateral pipe 13. Thus, boring can be reliably performed without misalignment with respect to the desired position.

Since the hole saw 1 is maintained in a constant position by the air pressure of the air bag 8 so as not to move in the orthogonal direction of the lateral pipe 13 during boring, the hole saw 1 can be prevented from slipping on the pipe lining material 14, moving in the orthogonal direction due to rotational recoil, and colliding with the internal peripheral surface 13a of the lateral pipe 13. Furthermore, even if the hole saw 1 overcomes the retaining force of the aforementioned air pressure and moves in the orthogonal direction, the hole saw 1 is enclosed by the protective cover 3, and therefore cannot directly collide with the internal peripheral surface 13a of the lateral pipe 13. There is also no direct collision of the hole saw 1 with the internal peripheral surface 13a of the lateral pipe 13 during insertion and withdrawal of the main body of the boring device into and out of the lateral pipe 13. It is therefore possible to prevent damage to the hole saw 1 due to collision and to prevent damage to the pipe lining material when the lateral pipe 13 is already lined by a pipe lining material.

Figure 5:
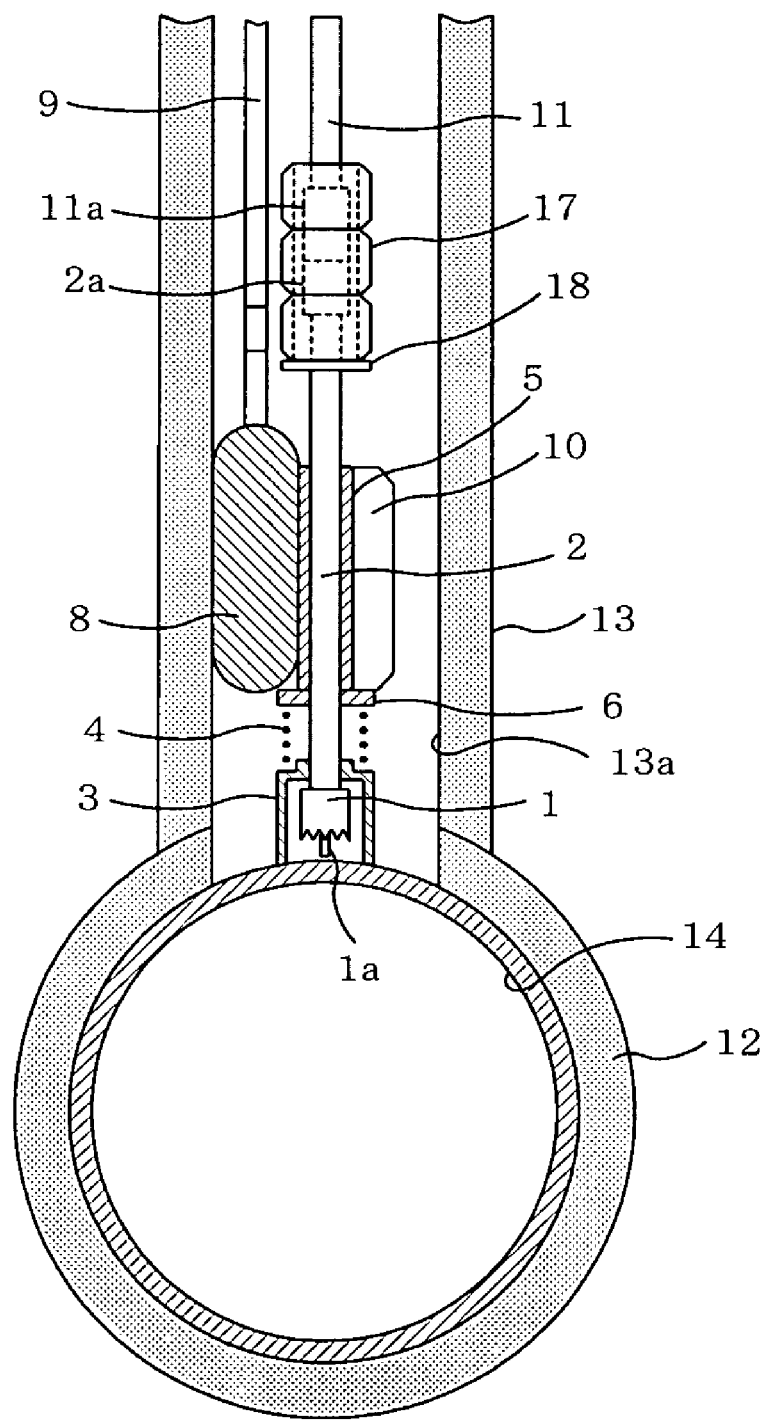
FIG. 5 is a sectional view showing a boring device according to another embodiment of the invention in which the boring device is shown as being positioned inside the lateral pipe.

FIG. 5 shows a boring device according to a second embodiment of the present invention. In FIG. 5, the main body of the boring device is positioned inside the lateral pipe 13, the same as in the embodiment of FIG. 2. The same symbols are used in FIG. 5 for components that are the same as those in FIG. 2, and description thereof is omitted.

In FIG. 5, the boring device is configured so that weighting members 17 can be mounted on the main body of the boring device. FIG. 5 shows a state in which three weighting members 17 are mounted, but any number of weighting members may be mounted.

The weighting members 17 weigh down on the hole saw 1 and are formed from metal or the like in a thick-walled cylindrical shape having a hole formed through the center thereof. Weighting members are mounted in the interval from the proximal end (the top end in FIG. 5) of the rotating shaft 2 to the distal end (the bottom end in FIG. 5) of the flexible shaft 11.

A disk-shaped weight stopper 18 for catching the weighting members 17 is therefore fixed at the top of the rotating shaft 2. The internal diameter of the hole in the center of the weighting members 17 is smaller than the diameter of the weight stopper 18, and is also slightly larger than the diameter of the joints 2a and 11a, which have a larger diameter than the main bodies of the rotating shaft 2 and flexible shaft 11, respectively. The top end of the rotating shaft 2 that includes the portion with the joints 2a and 11a, and the bottom end of the flexible shaft 11 can thereby be inserted into the hole of the weighting members 17, and the desired plurality of weighting members 17 can be stacked on the weight stopper 18 and mounted in the main body of the boring device.

Grease or lubricating oil is applied in advance to the undersides and internal peripheral surfaces of the holes of the weighting members 17 in order to prevent the friction of the weighting members 17 from impeding the rotation of the rotating shaft 2 and flexible shaft 11 as much as possible. Other aspects of this configuration are the same as those in the first embodiment.

With the boring device of the second embodiment thus configured, the portion of the pipe lining material 14 of the main pipe 12 that blocks the opening at the end of the lateral pipe 13 is bored through from the side of the lateral pipe 13, in the same manner as by the apparatus of the first embodiment. At that time, the desired number of weighting members 17 are first stacked onto the weight stopper 18 as described above and mounted when the joints 2a and 11a are linked together, before the main body of the boring device is inserted into the lateral pipe 13.

The main body of the boring device to which the air hose 9 and flexible shaft 11 are connected is inserted into the lateral pipe 13, the air hose 9 and flexible shaft 11 are reeled out, and the main body of the boring device is inserted into the approximate position shown in FIG. 5; specifically, to the position where the protective cover 3 or the distal end of the drill 1a comes in contact with the pipe lining material 14 blocking the opening of the lateral pipe 13. Since the weight of the main body of the boring device in which the weighting members 17 are mounted is increased, this insertion can be smoothly performed merely by reeling out the flexible shaft 11 and the air hose 9, without any particular pushing of the flexible shaft 11.

Then, in the same manner as in the first embodiment, high-pressure air is fed to the air bag 8, and the hole saw 1 is positioned in the orthogonal direction. The flexible shaft 11 is then reeled out slightly. The load of the weighting members 17 is applied to the hole saw 1 via the rotating shaft 2 in this arrangement. Therefore, the drill 1a of the hole saw 1 is firmly pressed against the pipe lining material 14 by this load.

The hole saw 1 is then rotated by the driving of the motor, whereby a small hole is first formed in the pipe lining material 14 by the drill 1a, and then a larger hole is formed by the main body of the hole saw 1. In this arrangement, the drill 1a or main body of the hole saw 1 is firmly pressed against the pipe lining material 14 by the weight of the weighting members 17, and the hole saw 1 is retained in a constant position in the orthogonal direction by the air pressure of the air bag 8, in the same manner as in the first embodiment. The overall inertia of the main body of the boring device is furthermore increased by the weight of the weighting members 17. Consequently, it becomes even harder for the hole saw 1 to slip on the pipe lining material 14 than in the first embodiment, and harder to move in the orthogonal direction even when slipping does occur. Collision (that is, indirect collision via the protective cover 3) of the hole saw 1 with the internal peripheral surface 13a of the lateral pipe 13 during boring can therefore be prevented even more reliably than in the first embodiment, and boring can be performed consistently and correctly.

In the configurations of both the embodiments described above, it is possible to use an inflatable bag that is inflated by pressure from water, oil, or another liquid, instead of the air bag 8. Boring may also be performed by a rotating blade other than the hole saw 1. It is apparent that the positioning technique of the present invention may also be applied to a boring device for boring the pipe lining material of a conduit other than that of a sewer system.

What is claimed is:

1. A boring device that is inserted into a lateral pipe to bore a pipe lining material which is inserted into a main pipe across the lateral pipe intersecting therewith and a portion of which blocks an opening of the lateral pipe that communicates with the main pipe, the boring device comprising:
    a boring blade for boring the pipe lining material;
    positioning means for positioning the boring blade in the direction orthogonal to the longitudinal direction of the lateral pipe; and
    means for driving the boring blade towards the pipe lining material while the boring blade is positioned in the direction orthogonal to the longitudinal direction of the lateral pipe so as to bore through the portion of the pipe lining material that is blocking the opening of the lateral pipe.

2. A boring device according to claim 1; wherein a weighing member is provided for weighing down on the boring blade to urge the boring blade towards the pipe lining material.

3. A boring device according to claim 1; wherein a protective cover is provided for enclosing and protecting the boring blade.

4. A boring device according to claim 1; wherein the positioning means is provided so as to be detachable.

5. A boring device according to claim 1; wherein the positioning means comprises an air bag that is inflated so as to position the boring blade in the direction orthogonal to the longitudinal direction of the lateral pipe.

6. A boring device according to claim 1; wherein the boring blade is rotatably driven via a flexible shaft.

7. A boring device according to claim 1; wherein the positioning means comprises a supporting member and an inflatable bag that is inflated in the lateral pipe so that the inflatable bag and the supporting member are pressed against an internal peripheral surface of the lateral pipe to position the boring blade in the direction orthogonal to the longitudinal direction of the lateral pipe.

8. A boring device according to claim 7; further comprising a rotating shaft for rotating the rotating blade and a bearing member for rotatably bearing the rotating shaft.

9. A boring device according to claim 8; wherein the inflatable bag is mounted on one side of an external periphery of the bearing member and the supporting member is mounted on the other side of the external periphery of the bearing member.

10. A boring device according to claim 8; wherein when the inflatable bag is inflated, the rotating shaft is also positioned in the direction orthogonal to the longitudinal direction of the lateral pipe.

11. A boring device according to claim 8; wherein the supporting member comprises a plurality of support fins each having one end connected to the bearing member and another end that presses against the internal peripheral surface of the lateral pipe when the inflatable bag is inflated.

12. A boring device according to claim 8; further comprising bag mounting members connected to one side of an external periphery of the bearing member for mounting the inflatable bag when the inflatable bag is inflated; and wherein the supporting member is mounted on the other side of the external periphery of the bearing member.

13. A boring device that is inserted into a lateral pipe to bore a pipe lining material which is inserted into a main pipe across the lateral pipe intersecting therewith and a portion of which blocks an opening of the lateral pipe that communicates with the main pipe, the boring device comprising:
    a rotatable shaft mounted to undergo rotation;
    a bearing member for rotatably bearing the rotatable shaft;

a boring blade mounted on the rotatable shaft for rotation therewith to bore through the portion of the pipe lining material that is blocking the opening of the lateral pipe;

a supporting member mounted on one side of an external periphery of the bearing member; and an inflatable bag mounted on the other side of the external periphery of the bearing member and inflatable in the lateral pipe so that the inflatable bag and the supporting member are pressed against an internal peripheral surface of the lateral pipe to position the rotatable shaft and the boring blade in a direction orthogonal to a longitudinal direction of the lateral pipe when the boring blade bores through the portion of the pipe lining material that is blocking the opening of the lateral pipe.

14. A boring device according to claim 13; further comprising at least one weighing member for weighing down on the boring blade to urge the boring blade towards the pipe lining material.

15. A boring device according to claim 13; further comprising a protective cover that encloses and protects the boring blade.

16. A boring device according to claim 13; further comprising bag mounting members connected to the other side of the external periphery of the bearing member for mounting the inflatable bag when the inflatable bag is inflated.

17. A boring device that is inserted into a lateral pipe to bore a pipe lining material which is inserted into a main pipe across the lateral pipe intersecting therewith, the boring device comprising:

a rotatable shaft mounted to undergo rotation;

a boring blade mounted on the rotatable shaft for rotation therewith to bore the pipe lining material;

a bearing member for rotatably bearing the rotatable shaft;

a mounting member connected to one side of an external periphery of the bearing member;

a supporting member connected to the other side of the external periphery of the bearing member; and an inflatable bag detachably mounted on the mounting member, the inflatable bag being inflatable in the lateral pipe so that the inflatable bag and the supporting member are pressed against an internal peripheral surface of the lateral pipe to position the rotatable shaft and the boring blade in a direction orthogonal to a longitudinal direction of the lateral pipe when the boring blade bores the pipe lining material.

18. A boring device according to claim 17; further comprising at least one weighing member for weighing down on the boring blade to urge the boring blade towards the pipe lining material.

19. A boring device according to claim 17; further comprising a protective cover that encloses and protects the boring blade.

20. A boring device according to claim 19; further comprising a spring for biasing the protective cover in the direction of the pipe lining material when the boring device is disposed in the lateral pipe.

* * * * *